United States Patent
Xiong et al.

(10) Patent No.: US 11,882,021 B2
(45) Date of Patent: Jan. 23, 2024

(54) PACKET FORWARDING METHOD, APPARATUS AND SYSTEM, NETWORK DEVICE AND STORAGE MEDIUM

(71) Applicant: ZTE CORPORATION, Guangdong (CN)

(72) Inventors: Quan Xiong, Guangdong (CN); Ran Chen, Guangdong (CN); Jinghai Yu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 17/909,472

(22) PCT Filed: Dec. 16, 2020

(86) PCT No.: PCT/CN2020/136929
§ 371 (c)(1),
(2) Date: Sep. 6, 2022

(87) PCT Pub. No.: WO2021/174958
PCT Pub. Date: Sep. 10, 2021

(65) Prior Publication Data
US 2023/0127464 A1    Apr. 27, 2023

(30) Foreign Application Priority Data
Mar. 6, 2020   (CN) .......................... 202010152884.8

(51) Int. Cl.
*H04L 45/00*    (2022.01)
*H04L 45/16*    (2022.01)
*H04L 45/50*    (2022.01)

(52) U.S. Cl.
CPC .............. *H04L 45/16* (2013.01); *H04L 45/50* (2013.01); *H04L 45/566* (2013.01)

(58) Field of Classification Search
CPC ........ H04L 45/16; H04L 45/50; H04L 45/566
(Continued)

(56) References Cited

U.S. PATENT DOCUMENTS 10,979,350 B1 * 4/2021 Nainar .................... H04L 45/44
2016/0119159 A1   4/2016 Zhao et al.
(Continued)

FOREIGN PATENT DOCUMENTS

CN        106603406 A    4/2017
CN        106603413 A    4/2017
(Continued)

OTHER PUBLICATIONS

WIPO, International Search Report dated Mar. 1, 2021.
China Patent Office, First Office Action dated Aug. 3, 2023 for application No. CN202010152884.8.

*Primary Examiner* — Glenford J Madamba
(74) *Attorney, Agent, or Firm* — Li & Cai Intellectual Property (USA) Office

(57) ABSTRACT

Disclosed in the embodiments of the present disclosure are a packet forwarding method, apparatus and system, a network device and a storage medium. The method includes: carrying, according to Deterministic Networking (DetNet) requirements for a multicast packet based on Bit Index Explicit Replication (BIER), corresponding DetNet configuration information in BIER header information of the multicast packet; and sending the multicast packet carrying the BIER header information.

17 Claims, 7 Drawing Sheets

(58) Field of Classification Search
USPC .......................................................... 709/238
See application file for complete search history.

(56) References Cited

U.S. PATENT DOCUMENTS

| | | | |
|---|---|---|---|
| 2017/0222920 A1* | 8/2017 | Thubert | .................. H04L 69/22 |
| 2021/0036950 A1 | 2/2021 | Zhu | |
| 2022/0224633 A1 | 7/2022 | Xie et al. | |

FOREIGN PATENT DOCUMENTS

| | | | |
|---|---|---|---|
| CN | 106656524 | A | 5/2017 |
| CN | 106656794 | A | 5/2017 |
| CN | 107294861 | A | 10/2017 |
| CN | 107623630 | A | 1/2018 |
| CN | 108632678 | A | 10/2018 |
| CN | 108989209 | A | 12/2018 |
| CN | 109246017 | A | 1/2019 |
| CN | 109391478 | A | 2/2019 |
| CN | 110401599 | A | 11/2019 |
| CN | 110784411 | A | 2/2020 |
| EP | 3364613 | A2 | 8/2018 |
| EP | 3364613 | B1 | 6/2020 |
| IN | 109660460 | A | 4/2019 |
| WO | 2016198013 | A1 | 12/2016 |
| WO | 2018010658 | A1 | 1/2018 |
| WO | 2018171396 | A1 | 9/2018 |

* cited by examiner

PACKET FORWARDING METHOD, APPARATUS AND SYSTEM, NETWORK DEVICE AND STORAGE MEDIUM

CROSS-REFERENCE TO RELATED APPLICATIONS

This is a National Phase Application filed under 35 U.S.C. 371 as a national stage of PCT/CN2020/136929, filed on Dec. 16, 2020, an application claiming the priority of Chinese Patent Application No. 202010152884.8, filed on Mar. 6, 2020, the contents of which are incorporated herein in their entirety by reference.

TECHNICAL FIELD

Embodiments of the present disclosure relate to the field of communication technology, and specifically relates to a packet forwarding method, apparatus and system, a network device and a storage medium.

BACKGROUND

Bit Index Explicit Replication (BIER) is a multicast data forwarding technology which defines a novel network multicast architecture and has the advantages of simple deployment, rapid convergence and support of ultra-large capacity services. The BIER technology may be combined with the virtual private network (VPN) technology to implement sound VPN multicast, thereby providing, under a new network architecture, an efficient multicast solution for various large video services, such as Internet live broadcast, Internet Protocol Television (IPTV) or the like, and thus improving the network efficiency.

According to the definition of the 5th generation wireless systems (5G) technology under the 3rd Generation Partnership Project (3GPP) standards, different 5G services have differentiated requirements on the network, and multicast services such as large videos have higher requirements on bandwidth, time delay and reliability. Therefore, a deterministic time delay and reliable services are desired for BIER-based multicast to meet the requirements of less time delay and low packet loss rate in the 5G network.

SUMMARY

Embodiments of the present disclosure provide a packet forwarding method, apparatus and system, a network device and a storage medium which can provide Deterministic Networking (DetNet) services for a BIER-based multicast packet.

In a first aspect, an embodiment of the present disclosure provides a packet forwarding method applied to a first device, the method including: carrying, according to Deterministic Networking (DetNet) requirements for a multicast packet based on Bit Index Explicit Replication (BIER), corresponding DetNet configuration information in BIER header information of the multicast packet; and sending the multicast packet carrying the BIER header information.

In a second aspect, an embodiment of the present disclosure provides a packet forwarding method applied to a second device, the method including: acquiring, from a received multicast packet carrying Bit Index Explicit Replication (BIER) header information, Deterministic Networking (DetNet) configuration information carried in the BIER header information; and processing the packet according to the DetNet configuration information carried in the BIER header information.

In a third aspect, an embodiment of the present disclosure provides a packet forwarding method, including: using a first device to carry, according to Deterministic Networking (DetNet) requirements for a multicast packet based on Bit Index Explicit Replication (BIER), corresponding DetNet configuration information in BIER header information of the multicast packet, and send the multicast packet carrying the BIER header information; and using a second device configured to acquire, from the received multicast packet carrying the BIER header information, the DetNet configuration information carried in the BIER header information, and process the packet according to the DetNet configuration information.

In a fourth aspect, an embodiment of the present disclosure provides a first device, including: a packet encapsulation module configured to carry, according to Deterministic Networking (DetNet) requirements for a multicast packet based on Bit Index Explicit Replication (BIER), corresponding DetNet configuration information in BIER header information of the multicast packet; and a packet sending module configured to send the multicast packet carrying the BIER header information.

In a fifth aspect, an embodiment of the present disclosure provides a second device, including: a configuration acquiring module configured to acquire, from a received multicast packet carrying Bit Index Explicit Replication (BIER) header information, Deterministic Networking (DetNet) configuration information carried in the BIER header information; and a packet processing module configured to process the packet according to the DetNet configuration information.

In a sixth aspect, an embodiment of the present disclosure provides a packet forwarding node apparatus, including: a first device configured to carry, according to Deterministic Networking (DetNet) requirements for a multicast packet based on Bit Index Explicit Replication (BIER), corresponding DetNet configuration information in BIER header information of the multicast packet, and send the multicast packet carrying the BIER header information; and a second device configured to acquire, from the received multicast packet carrying the BIER header information, the DetNet configuration information carried in the BIER header information, and process the packet according to the DetNet configuration information.

In a seventh aspect, an embodiment of the present disclosure provides a packet forwarding system, including: a memory and a processor; where the memory is configured to store executable program codes; and the processor is configured to read the executable program codes stored in the memory to perform the packet forwarding method according to any of the above aspects.

In an eighth aspect, an embodiment of the present disclosure provides a computer-readable storage medium storing instruction which, when executed on a computer, cause the computer to perform the packet forwarding method according to any of the above aspects.

According to the packet forwarding method, apparatus and system, the network device and the storage medium in the embodiments of the present disclosure, the first device may carry, according to the DetNet requirements for BIER-based multicast, DetNet configuration information in the BIER header information, and send a BIER multicast packet carrying the DetNet configuration information, thereby providing a deterministic time delay and reliable services for the BIER-based multicast, and meeting the requirements of less time delay and low packet loss rate in the 5G network.

BRIEF DESCRIPTION OF DRAWINGS

Accompanying drawings are provided for further understanding of this disclosure and constitute a part of the specification. Hereinafter, these drawings are intended to explain the present disclosure together with the following specific implementations, but should not be considered as a limitation of the present disclosure.

DETAIL DESCRIPTION OF EMBODIMENTS

Figure 1:
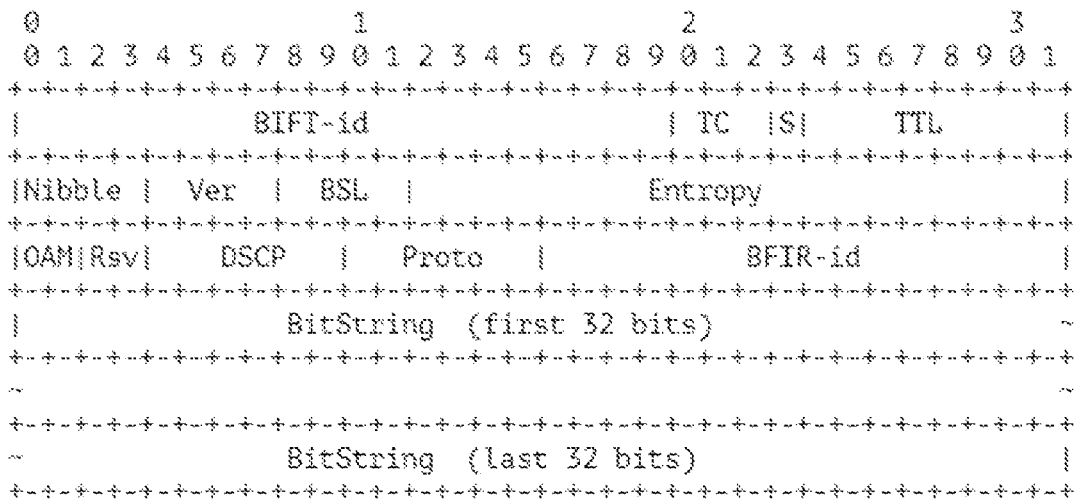
FIG. 1 is a schematic diagram showing a packet format of a BIER header in a multiprotocol label switching (MPLS) network.

Hereinafter, specific implementations of the present disclosure will be described with respect to the accompanying drawings. It will be appreciated that the specific implementations as set forth herein are merely for the purpose of illustration and explanation of the present disclosure and should not be constructed as a limitation thereof. It will be apparent to one skilled in the art that the present disclosure may be practiced without some of these specific details. The following description of the embodiments is merely intended to provide a better understanding of the present disclosure by illustrating examples thereof.

It should be noted that the term "including", "comprising" or any variant thereof used herein means to be non-exclusive so that a process, method, item or device including a series of elements includes not only said elements, but also other elements not explicitly listed, or inherent elements of such processes, methods, items or device. In the absence of more limitations, an element defined by "including . . . " does not exclude the existence of additional identical elements in the process, method, item or device including the element.

For better understanding of the present disclosure, the packet forwarding method, apparatus and system, the network device, and the storage medium according to the embodiments of the present disclosure will be described in detail below with reference to the accompanying drawings. It should be noted that these embodiments are not intended to limit the scope of the present disclosure.

In an embodiment of the present disclosure, the BIER technology defined by Internet Engineering Task Force (IETF) Request for Comments (RFC) document 8279 may divide a multicast network into BIER domains, each including a head node device (i.e., a bit-forwarding ingress router (BFIR)), an intermediate node device (i.e., a bit-forwarding forwarding router (BFR)), and a tail node device (i.e., a bit-forwarding egress router (BFER)).

In a control plane, the BIER assigns a unique bit ID to each node in the network domain; and compared with the traditional forwarding mode in which a distribution tree is constructed based on multicast routing protocol, the BIER forwards information using a bit-indexed forwarding routing table (BFRT).

In a data plane, when entering the BIER domain, the multicast packet is encapsulated with a BIER header which includes bit ID information representing each egress node of the multicast packet; and when the multicast packet is forwarded in the BIER domain, a BIER forwarding table is searched through a bit index in the BIER header, so as to replicate and forward the multicast packet to an egress node corresponding to each bit index.

In some embodiments, depending on the transport protocol, the BIER data plane may include a variety of different types, such as an MPLS data plane, an IPv6 data plane, or other non-MPLS data planes such as an Ethernet data plane, or the like. Taking the MPLS data plane as an example, the packet format of a BIER header based on the MPLS data plane specified in IETF RFC8296 will be briefly described below.

FIG. 1 is a schematic diagram showing a packet format of a BIER header in an MPLS network. As shown in FIG. 1, a BIFT-id field in the BIER header indicates a Bit Index Forwarding Table (BIFT) ID, a bitstring field indicates a specific forwarding path of a multicast flow, and each BFR may search in the forwarding table according to BitPosition (BP) in bitstring and perform replication and forwarding.

In order to meet the requirements of deterministic services and the like, IETF RFC8655 has proposed related technical architectures for Deterministic Networking (DetNet), which provide deterministic services for layer 2 bridge and layer 3 routing network, and the requirements of Quality of Service (QoS) include: a deterministic delay upper limit, a low packet loss rate, jitter reduction, high reliability and so on.

Figure 2:
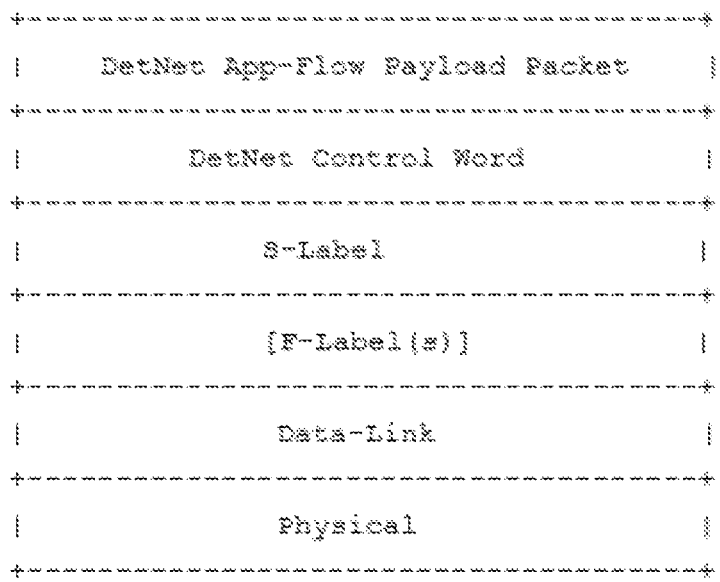
FIG. 2 is a schematic diagram showing a packet format of DetNet in an MPLS forwarding plane.
Figure 3:
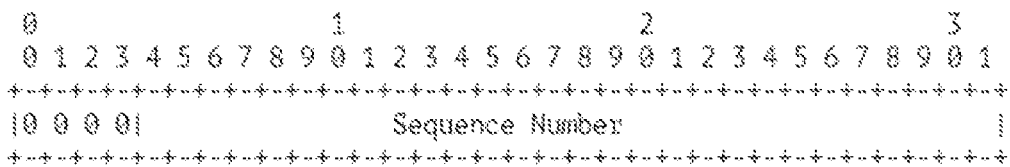
FIG. 3 is a schematic diagram showing a packet format of a DetNet control word in FIG. 2.

The draft-ietf-detnet-mpls-04 of IETF DetNet specifies the packet format of the MPLS data plane. The packet format of the MPLS data plane will be described below with reference to FIGS. 2 and 3. FIG. 2 is a schematic diagram showing a packet format of DetNet in an MPLS forwarding plane; and FIG. 3 is a schematic diagram showing a packet format of a DetNet control word in FIG. 2.

As shown in FIG. 2, the MPLS packet format extends 3 fields from the original MPLS, i.e., DetNet control word, S-label and F-labels. As shown in FIG. 3, the field of DetNet control word includes a sequence number field of the packet.

The sequence number is used for implementation of packet replication, elimination and ordering in the DetNet technology, the S-label is used for identifying a DetNet flow, and the F-Labels are used for implementation of a deterministic path function in the DetNet technology, and thus display the route.

The current DetNet packet format does not consider BIER multicast services, and cannot implement forwarding of BIER multicast DetNet. In order to provide DetNet of the BIER multicast service, the present disclosure proposes a packet forwarding method for implementing forwarding of BIER multicast DetNet.

In embodiments of the present disclosure, a BIER header of a multicast flow may be extended, and related functions of the DetNet technology may be added through the extended BIER header. A packet format of the extended BIER header is described below with reference to FIGS. 4 to 6.

Figure 4:
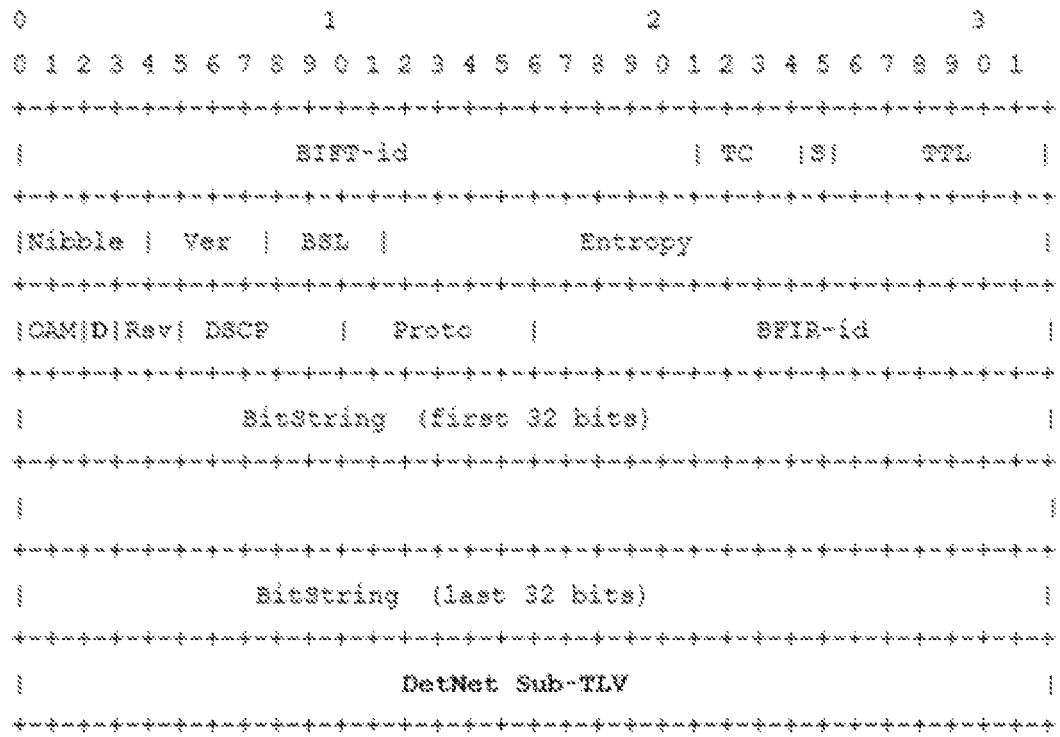
FIG. 4 is a schematic diagram showing a packet format of an extended BIER header in an embodiment of the present disclosure.
Figure 5:
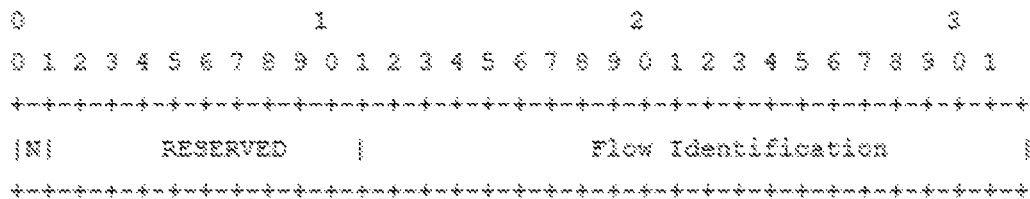
FIG. 5 is a schematic diagram showing a packet format of a flow ID in the BIER header.
Figure 6:
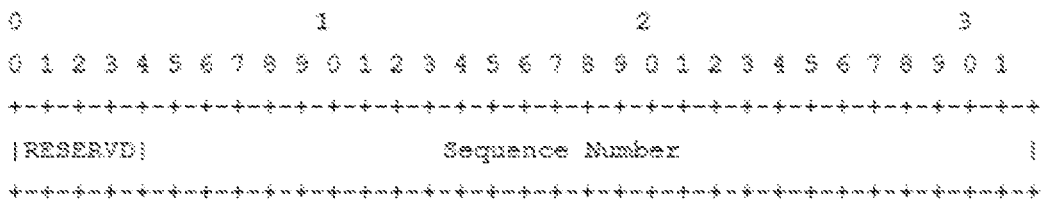
FIG. 6 is a schematic diagram showing a packet format of a sequence number in the BIER header.

FIG. 4 is a schematic diagram showing a packet format of an extended BIER header in an embodiment of the present disclosure; FIG. 5 is a schematic diagram showing a packet format of a flow ID in the BIER header; and FIG. 6 is a schematic diagram showing a packet format of a sequence number in the BIER header.

As shown in FIG. 4, an extended identification bit(s), and an extended field of DetNet Sub tag-length-value (DetNet Sub-TLV) (DetNet Sub-TLV field), are added to the header information of the BIER header. Herein, the extended identification bit D may be carried (located) in the Reserved field in the BIER header, and the DetNet Sub-TLV field may be carried (located) after, or in the middle of, the BIER header, such as before BitString.

The extended identification bit(s) D has a fixed number of bits, such as 1 bit. By setting the extended identification bit D to a first preset value, the BIER header is identified as carrying a DetNet Sub-TLV field. As an example, the extended identification bit D being set to 1 indicates that the BIER header is extended with the DetNet Sub-TLV field, and thereby it is possible to implement the BIER multicast DetNet.

With continued reference to FIG. 4, in the header information of the BIER header, the DetNet Sub-TLV field contains related information of the DetNet, for example, parameter information including a flow ID and a sequence number of the DetNet.

FIG. 5 is a schematic diagram showing a specific packet structure of the flow ID in the DetNet Sub-TLV field; and FIG. 6 is a schematic diagram showing a packet structure of the sequence number in the DetNet Sub-TLV field.

In FIG. 5, the flow ID may be used to uniquely identify a BIER deterministic multicast flow. Exemplarily, the flow ID may be defined as 20 bits, 24 bits, or 28 bits, and the number of bits of the flow ID may be customized as desired, which is not specifically limited in the embodiments of the present disclosure.

With continued reference to FIG. 5, the DetNet Sub-TLV field may carry a sequence number identification bit N in the Reserved field of the DetNet Sub-TLV field. Exemplarily, the sequence number identification bit N occupies one bit of the Reserved field, and if N is set to 1, it indicates that a sequence number field is included after the sequence number identification bit N.

As shown in FIG. 6, the sequence number field is used to carry a sequence number of the multicast packet, such sequence number can be used for replication, elimination and ordering of the multicast packet. Exemplarily, the sequence number may be defined as 16 bits or 28 bits, and the number of bits of the sequence number may be customized as desired, which is not specifically limited in the embodiments of the present disclosure.

Figure 7:
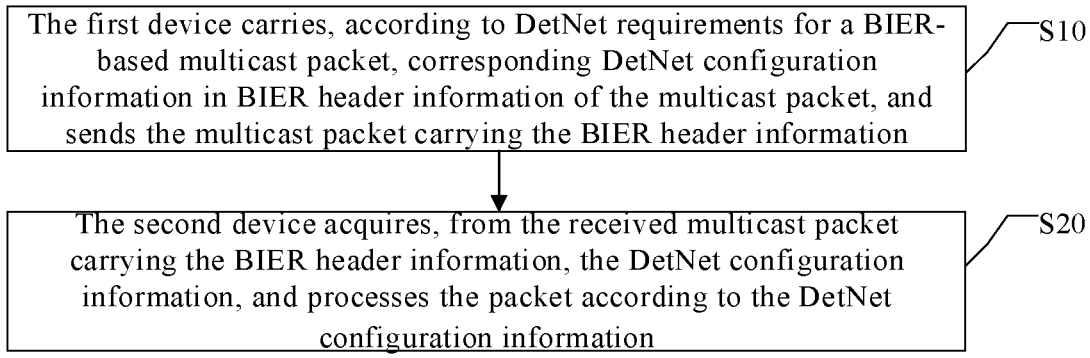
FIG. 7 is a schematic flowchart of a packet forwarding method according to an embodiment of the present disclosure.

Based on the extended BIER header information of the multicast flow as described above, the packet forwarding method according to the embodiments of the present disclosure will be described in detail below. FIG. 7 is a schematic diagram of a packet forwarding method according to an embodiment the present disclosure. In the following description of the embodiments, the first device is a head node device, and the second device is an intermediate node device or a tail node device. The packet forwarding method includes the following operations S10 to S20.

In operation S10, the first device carries, according to Deterministic Networking (DetNet) requirements for a multicast packet based on Bit Index Explicit Replication (BIER), corresponding DetNet configuration information in BIER header information of the multicast packet, and sends the multicast packet carrying the BIER header information.

In operation S20, the second device acquires, from the received multicast packet carrying the BIER header information, the DetNet configuration information, and processes the packet according to the DetNet configuration information.

According to the packet forwarding method in the embodiment of the present disclosure, after carrying, according to DetNet requirements for BIER-based multicast, DetNet configuration information in the BIER header information, the first device sends the packet to the second device; and after receiving the packet, the second device acquires the DetNet configuration information carried in the packet from the BIER header information, and processes the packet according to the DetNet configuration information, thereby providing deterministic delay and reliable services for the BIER-based multicast, and providing DetNet for the BIER multicast.

In an embodiment, the packet processing method further includes operation S11. In operation S11, the first device carries an extended identification bit in the BIER header information, where the extended identification bit, when set, is used for indicating that the DetNet configuration information is present in the BIER header information.

In this embodiment, the extended identification bit in the BIER header is used for identifying a field corresponding to the extended DetNet configuration information, thereby implementing flexible setting of the BIER header while remaining compatible with the existing BIER header.

In an embodiment, the first device carries a flow ID in the DetNet configuration information, where one BIER multicast flow is uniquely identified through the flow ID.

Specifically, the flow ID is ID information defined corresponding to a packet type, the packet type including: an IPv6 packet, a multiprotocol label switching protocol (MPLS) packet, or an Ethernet packet.

In an embodiment, in a case where the BIER-based multicast packet is an MPLS packet, the flow ID is an MPLS label or a mapping value of the MPLS label; and in a case where the BIER-based multicast packet is an IPv6 packet or an Ethernet packet, the flow ID is a unique flow ID assigned to the BIER multicast flow.

In an embodiment of the present disclosure, one BIER multicast flow can be uniquely identified through the flow ID. Different multicast packet types have different requirements on DetNet. When a packet is processed according to the DetNet configuration information, it is required to identify the multicast flow in the packet first.

It should be noted that depending on the transport protocol, the BIER data plane may include a variety of different types, such as MPLS packets, IPv6 packets, and other non-MPLS packets, or the like, which are not described in detail in the embodiments of the present disclosure.

In an embodiment, in a case where the DetNet requirements include packet replication and elimination, before sending the multicast packet carrying the BIER header information, the method further includes operation S12. In operation S12, the first device replicates the multicast packet carrying the BIER header information, and carries a packet sequence number in the DetNet configuration information.

In this embodiment, to implement the functions of packet replication and elimination, a sequence number of the multicast packet may be set in the DetNet configuration information.

In an embodiment, the packet forwarding method further includes operation S13. In operation S13, the first device carries a sequence number identification bit in the DetNet configuration information, where the sequence number identification bit, when set, is used for indicating that the packet sequence number is present in the DetNet configuration information.

In the description of the embodiments of the present disclosure, being set means being set to value 1. In embodiments of the present disclosure, the packet sequence number in the DetNet configuration information may be identified/labeled through the sequence number identification bit.

Exemplarily, if the sequence number identification bit is set to 1, it may indicate that a packet sequence number is contained in the DetNet configuration information, and replication and elimination of the multicast are required; and if the sequence number identification bit is set to 0, it may indicate that no packet sequence number is contained in the DetNet configuration information, and replication or elimination of the multicast is not required, thereby implementing flexible setting of the BIER header.

In an embodiment, in a case where the BIER-based multicast packet is an IPv6 packet, the BIER header information is carried in the next header field (Next Header) of the IPv6 packet; in a case where the BIER-based multicast packet is an MPLS packet, the BIER header information carries an MPLS label; and in a case where the BIER-based multicast packet is an Ethernet packet, the BIER header information carries a BIFT ID.

Specifically, in a case where the BIER-based multicast packet is an MPLS packet or an Ethernet packet, the first device generates the BIER header information according to an RFC8296 format.

In this embodiment, packets of different transport protocols may be encapsulated according to the extended BIER header in the embodiments of the present disclosure. That is, DetNet configuration information corresponding to the Det-Net requirements is carried in the BIER header information of the packets of different transport protocols.

In an embodiment, before acquiring the DetNet configuration information, the packet forwarding method further includes the following operations S31 to S32. In operation S31, the second device reads an extended identification bit carried in the BIER header information, and determines whether the extended identification bit is set. In operation S32, in response to determining that the extended identification bit is set, the second device determines that the received multicast packet carries the DetNet configuration information.

In this embodiment, by determining the value of the extended identification bit in the BIER header information, it is possible to determine whether the multicast packet carries the DetNet configuration information. Then, the second device may process the packet according to the DetNet configuration information.

Exemplarily, in a case where the extended identification bit is 1, it is determined that the DetNet configuration information is present in the BIER header information; and in a case where the extended identification bit is 0, it is determined that no DetNet configuration information is present in the BIER header information, thereby implementing flexible reading of the packet information, and improving the flexibility and efficiency of packet processing.

In an embodiment, the second device is an intermediate node device, and the packet forwarding method further includes operation S41. In operation S41, if the extended identification bit is not set (i.e., not set to 1), the intermediate node device forwards the received multicast packet based on BIER.

In this embodiment, if the intermediate node device determines that the extended identification bit in the BIER header information of the received packet is not set, the packet may be forwarded as a generalized BIER packet.

In an embodiment, the second device is an intermediate node device, and the processing the packet according to the DetNet configuration information in operation S21 may include operation S51. In operation S51, the second device identifies, according to a flow ID carried in the DetNet configuration information, a multicast flow from the received multicast packet carrying the BIER header information, and configures reserved resources for the identified multicast flow.

In this embodiment, the intermediate node device configures reserved resources, such as a broadband or a cache, for the identified multicast flow to meet the requirements on reserved resources for the corresponding multicast packet, thereby implementing congestion control on a DetNet forwarding path node.

In an embodiment, the processing the packet according to the DetNet configuration information may include: acquiring, by the second device, a packet sequence number carried in the DetNet configuration information, and implementing replication and elimination on the received multicast packet based on the sequence number.

In an embodiment, the DetNet configuration information further carries a sequence number identification bit, and before acquiring the packet sequence number carried in the DetNet configuration information, the packet forwarding method further includes the following operations S61 to S62. In operation S61, determining whether the sequence number identification bit is set. In operation S62, in response to determining in operation S61 that the sequence number identification bit is set, determining that the packet sequence number is present in the DetNet configuration information.

In this embodiment, the intermediate node device or tail node device reads the extended DetNet configuration information in the received packet, and determines whether the sequence number identification bit carried in the DetNet configuration information is set. Exemplarily, if the carried sequence number identification bit is set to 1, it is determined that the sequence number is carried in the DetNet configuration information, and replication processing and elimination processing are performed on the multicast packet; and if the carried sequence number identification bit is set to 0, it is determined that no packet sequence number is present, and it is not necessary to implement replication or elimination on the multicast packet.

In an embodiment, the second device is an intermediate node device, and after processing the packet according to the DetNet configuration information in S21, the packet forwarding method further includes operation S71. In operation S71, the intermediate node device forwards the multicast packet based on BIER, the multicast packet having been processed according to the DetNet configuration information.

In this embodiment, the intermediate node device processes and forwards the packet according to the DetNet configuration information carried in the BIER header information, thereby the provision of DetNet for the multicast packet is realized.

In an embodiment, the second device is a tail node device, and after processing the packet according to the DetNet configuration information, the packet forwarding method further includes operation S81. In operation S81, the tail node device acquires and forwards a multicast service carried in the processed multicast packet.

In this embodiment, the tail node device performs DetNet processing according to the DetNet configuration, and forwards the multicast service after decapsulating the packet, thereby implementing the DetNet function in the BIER multicast technology.

In practical application scenarios, the head node device, the intermediate node device, and the tail node device in the embodiments of the present disclosure may execute packet forwarding based on BIER multicast DetNet, respectively. For better understanding of the present disclosure, the packet forwarding method applied to each node device described above will be further described below with reference to FIGS. 8 to 13.

Figure 8:
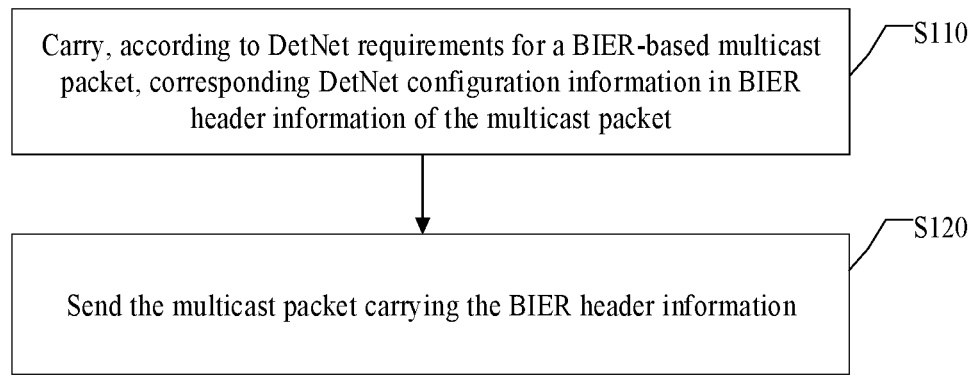
FIG. 8 is a schematic flowchart of a packet forwarding method according to another embodiment of the present disclosure.

FIG. 8 is a schematic diagram of a packet forwarding method according to another embodiment the present disclosure. As shown in FIG. 8, the packet forwarding method may be applied to a first device, and includes the following operations S110 to S120.

In operation S110, carrying, according to Deterministic Networking (DetNet) requirements for a multicast packet based on Bit Index Explicit Replication (BIER), corresponding DetNet configuration information in BIER header information of the multicast packet.

In operation S120, sending the multicast packet carrying the BIER header information.

In this embodiment, the first device may be a head node device (BFIR). The head node device may encapsulate, according to DetNet requirements for BIER multicast, the multicast packet according to the BIER header extended in the present disclosure, and carry a DetNet Sub-TLV field in the BIER header information of the multicast packet to provide DetNet through BIER multicast service forwarding.

In an embodiment, before operation S120, the packet forwarding method may further include operation S111. In operation S111, carrying an extended identification bit in the BIER header information, where the extended identification bit, when set, is used for indicating that the DetNet configuration information is present in the BIER header information.

In this embodiment, the head node device may, according to the DetNet requirements, set an extended identification bit in the BIER header to label the field corresponding to the extended DetNet configuration information in the BIER header, thereby implementing flexible setting of the BIER header while remaining compatible with the existing BIER header.

In an embodiment, before operation S120, the packet forwarding method may further include operation S112. In operation S112, carrying a flow ID in the DetNet configuration information, where one BIER multicast flow is uniquely identified through the flow ID.

Specifically, the flow ID is ID information corresponding a multicast packet type, the packet type including: an IPv6 packet, a multiprotocol label switching protocol (MPLS) packet, or an Ethernet packet.

In this embodiment, different types of multicast packets correspond to different flow IDs. The flow ID of a multicast packet may be set according to the packet type.

As an example, in a case where the BIER-based multicast packet is an MPLS packet, the flow ID is an MPLS label or a mapping value of the MPLS label; and in a case where the BIER-based multicast packet is an IPv6 packet or an Ethernet packet, the flow ID is a unique flow ID assigned to the BIER multicast flow.

In an embodiment, if the DetNet requirements include packet replication and elimination, then before operation S120, the packet forwarding method may further include operation S113. In operation S113, replicating the multicast packet carrying the BIER header information, and carrying a packet sequence number in the DetNet configuration information.

In this embodiment, in a case where functions of packet replication and elimination are required, the head node device may set a sequence number of the multicast packet in the DetNet configuration information.

In an embodiment, the packet forwarding method may further include operation S114. In operation S114, carrying a sequence number identification bit in the DetNet configuration information, where the sequence number identification bit, when set, is used for indicating that the packet sequence number is present in the DetNet configuration information.

In this embodiment, the sequence number in the DetNet configuration information is identified (labeled) by a sequence number identification bit. Exemplarily, if the sequence number identification bit is set to 1, it may indicate that a sequence number is contained in the DetNet configuration information, and replication and elimination of the multicast is desired; and if the sequence number identification bit is set to 0, it may indicate that no sequence number is contained in the DetNet configuration information, and replication and elimination of the multicast is not desired, thereby implementing flexible setting of the BIER header.

In an embodiment, in a case where the BIER-based multicast packet is an IPv6 packet, the BIER header information is carried in a Next Header field of the IPv6 packet. In this embodiment, the IPv6 packet may be encapsulated according to the extended BIER header in the embodiment of the present disclosure.

In an embodiment, in a case where the BIER-based multicast packet is an MPLS packet, the BIER header information carries an MPLS label. In this embodiment, the MPLS packet may be encapsulated according to the extended BIER header in the embodiment of the present disclosure.

In an embodiment, in a case where the BIER-based multicast packet is an Ethernet packet, the BIER header information carries a BIFT ID. In this embodiment, the Ethernet packet may be encapsulated according to the extended BIER header in the embodiment of the present disclosure.

In an embodiment of the present disclosure, the BIER-based multicast packet may include an MPLS packet or a packet based on another transport protocol besides the MPLS packet. In a case where the BIER-based multicast packet is an MPLS packet or an Ethernet packet, the BIER header information may be generated according to an RFC8296 format.

According to the packet forwarding method in the embodiment of the present disclosure, the head node device encapsulates, according to DetNet requirements for BIER multicast, the packet according to the extended BIER header shown in FIG. 4 in the embodiment of the present disclosure, and carries the DetNet configuration information in the BIER header by carrying the DetNet Sub-TLV field in the identification BIER header, and sends a BIER deterministic multicast packet carrying the DetNet configuration information to provide DetNet through BIER multicast service forwarding.

Figure 9:
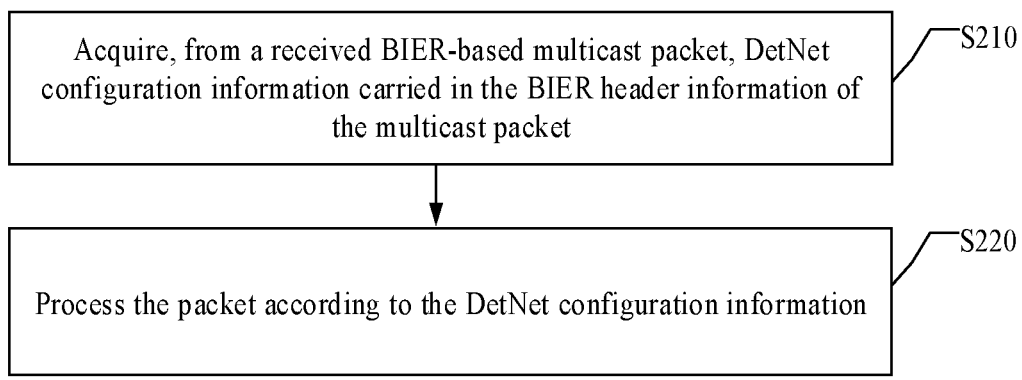
FIG. 9 is a schematic flowchart of a packet forwarding method according to yet another embodiment of the present disclosure.

FIG. 9 is a schematic flowchart of a packet forwarding method according to yet another embodiment of the present disclosure. As shown in FIG. 9, the packet forwarding method may be applied to a second device. The packet forwarding method may include the following operations S210 to S220.

In operation S210, acquiring, from a received multicast packet based on Bit Index Explicit Replication (BIER), DetNet configuration information carried in the BIER header information of the multicast packet.

In operation S220, processing the packet according to the DetNet configuration information.

In this embodiment, the second device may be an intermediate node device or a tail node device. According to the packet forwarding method in the embodiment of the present disclosure, after receiving the packet, the second device may process the multicast packet according to the DetNet configuration information carried in the packet, thereby providing DetNet services for forwarding of the BIER multicast service.

In an embodiment, an extended identification bit is set in the BIER header information of the received multicast packet. In this embodiment, before acquiring the DetNet configuration information carried in the multicast packet in S210, the packet forwarding method further includes the following operations S201 to S202. In operation S201, reading an extended identification bit carried in the BIER header information, and determining whether the extended identification bit is set. In operation S202, determining, if the extended identification bit is set, that the received multicast packet carries the DetNet configuration information.

In an embodiment, when the second device is an intermediate node device, and if the extended identification bit is not set, the intermediate node device forwards the received multicast packet based on BIER.

In this embodiment, the DetNet configuration information carried in the multicast packet is determined by determining a value of the extended identification bit set in the BIER header information. For example, when the extended identification bit is 1, it is determined that the DetNet configuration information is present in the BIER header information; and when the extended identification bit is 0, it is determined that no DetNet configuration information is present in the BIER header information, thereby implementing flexible reading of the packet information, and improving the flexibility and efficiency of packet processing.

In an embodiment, operation S220 may include operation 221. In operation S221, identifying, according to a flow ID carried in the DetNet configuration information, a multicast flow from the received multicast packet carrying the BIER header information, and configuring reserved resources for the identified multicast flow.

In this embodiment, multicast packets of different protocols have different requirements on reserved resources. Therefore, each BIER multicast flow is identified according to the flow ID, and reserved resources, such as a broadband or a cache, are configured for the identified multicast flow to meet the requirements on reserved resources for the corresponding multicast packet, thereby implementing congestion control on a DetNet forwarding path node.

In an embodiment, operation S220 may include operation 222. In operation S222, acquiring a packet sequence number carried in the DetNet configuration information, and implement replication and elimination on the received multicast packet based on the packet sequence number.

In an embodiment, the DetNet configuration information further carries a sequence number identification bit. In this embodiment, before acquiring the packet sequence number carried in the DetNet configuration information, the method further includes: determining whether the sequence number identification bit is set; and determining, if the sequence number identification bit is set, that the packet sequence number is present in the DetNet configuration information.

Exemplarily, when the sequence number identification bit is set to 1, it may be determined that the packet sequence number is present in the DetNet configuration information; and when the sequence number identification bit is set to 0, it may be determined that no packet sequence number is present in the DetNet configuration information.

In an embodiment, the second device is an intermediate node device, and after S220, the packet forwarding method further includes operation S230. In operation S230, the intermediate node device forwards the processed multicast packet based on BIER, the multicast packet having been processed according to the DetNet configuration information.

In an embodiment, the second device is a tail node device, and after S220, the packet forwarding method further includes operation S240. In operation S240, the tail node device acquires and forwards a multicast service carried in the processed multicast packet.

According to the packet forwarding method in the embodiment of the present disclosure, the intermediate node device, after receiving the BIER-based multicast packet, processes and forwards the packet according to the DetNet configuration information carried in the BIER header information; and the tail node device, after receiving the BIER-based multicast packet, processes the packet according to the DetNet configuration information carried in the BIER header information, and forwards the multicast service after decapsulating the packet, thereby providing DetNet for the BIER multicast packet.

Figure 10:
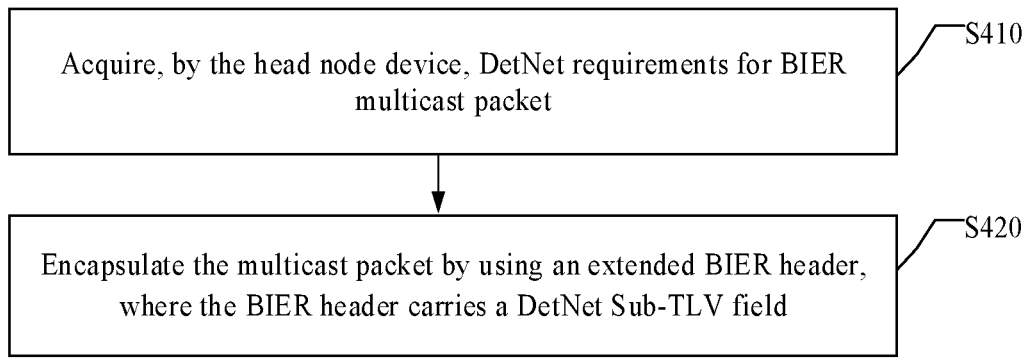
FIG. 10 is a schematic flowchart of packet processing at a head node device according to an embodiment of the present disclosure.
Figure 11:
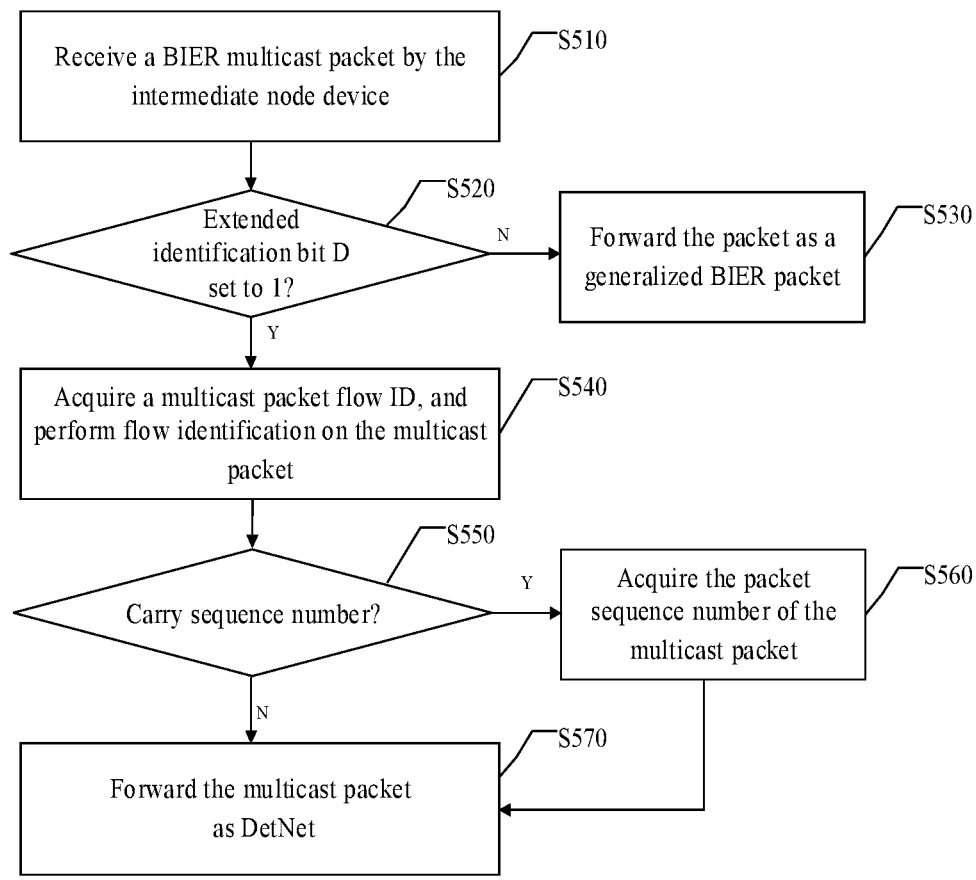
FIG. 11 is a schematic flowchart of packet processing at an intermediate node device according to an embodiment of the present disclosure.
Figure 12:
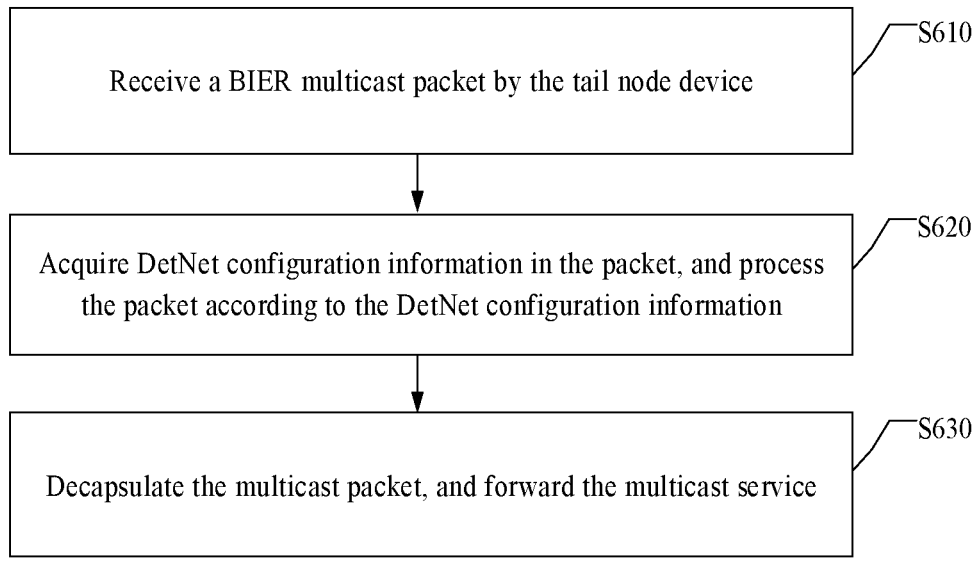
FIG. 12 is a schematic flowchart of packet processing at a tail node device according to an embodiment of the present disclosure.

Next, with reference to FIGS. 10 to 12, the packet processing flows at the head node device, the intermediate node device, and the tail node device in the exemplary embodiments of the present disclosure are described.

FIG. 10 is a schematic flowchart of packet processing at a head node device according to an embodiment of the present disclosure. As shown in FIG. 10, the packet processing flow at the head node device may include the following operations S410 to S420. In operation S410, acquiring, by the head node device, DetNet requirements for a BIER-based multicast packet. In operation S420, encapsulating the multicast packet by using an extended BIER header, where the BIER header carries a DetNet Sub-TLV field.

In this embodiment, the DetNet Sub-TLV field is configured to carry DetNet configuration information. The packet processing flow at the head node device in FIG. 10 may refer to the corresponding process in the packet forwarding method embodiment described above, and thus is not repeated here.

FIG. 11 is a schematic flowchart of packet processing at an intermediate node device according to an embodiment of the present disclosure. As shown in FIG. 11, the packet processing flow at the intermediate node device may include the following operations S510 to S570.

In operation S510, receiving a BIER multicast packet by the intermediate node device.

S520, determining whether an extended identification bit D carried in BIER header information is set to 1, determining, if the extended identification bit D is not set to 1, that the BIER header information does not carry DetNet configuration information and proceeding to S530; and determining, if the extended identification bit D is set to 1, that the BIER header information carries DetNet configuration information and proceeding to S540.

In operation S530, forwarding the packet as a generalized BIER packet.

In operation S540, acquiring a multicast packet flow ID from the DetNet configuration information, and performing flow identification on the multicast packet.

In operation S550, determining whether the DetNet configuration information carries a sequence number field, proceeding to S560 if no sequence number field is carried; and proceeding to S570 if a sequence number field is carried.

In operation S560, acquiring a packet sequence number of the multicast packet, to replicate and eliminate the multicast packet.

In operation S570, forwarding the multicast packet processed with the DetNet information based on BIER.

According to the packet processing method in the embodiment of the present disclosure, the intermediate node device, after receiving the BIER-based multicast packet, processes and forwards the packet according to the DetNet configuration information carried in the BIER header information, thereby the provision of DetNet for the multicast packet is realized.

It will be appreciated that the packet processing flow at the intermediate node device described in conjunction with FIG. 11 may refer to the corresponding process in the packet forwarding method embodiment applied to the intermediate node device in the second device described above, and thus is not repeated here.

FIG. 12 is a schematic flowchart of packet processing at a tail node device according to an embodiment of the present disclosure. As shown in FIG. 12, the packet processing flow at the tail node device may include the following operations S610 to S630. In operation S610, receiving a BIER multicast packet by the tail node device. In operation S620, acquiring DetNet configuration information in the packet, and processing the packet according to the DetNet configuration information. In operation S630, decapsulating the multicast packet, and forwarding the multicast service.

According to the packet processing method in the embodiment of the present disclosure, the tail node device, after receiving the multicast packet, may replicate, eliminate or perform other processing on the DetNet configuration, decapsulate the packet and forward a multicast service carried in the packet, so that the multicast service meets the DetNet requirements.

It will be appreciated that the packet processing flow at the tail node device described in conjunction with FIG. 12 may refer to the corresponding process in the packet forwarding method embodiment applied to the tail node device in the second device described above, and thus is not repeated here.

Figure 13:
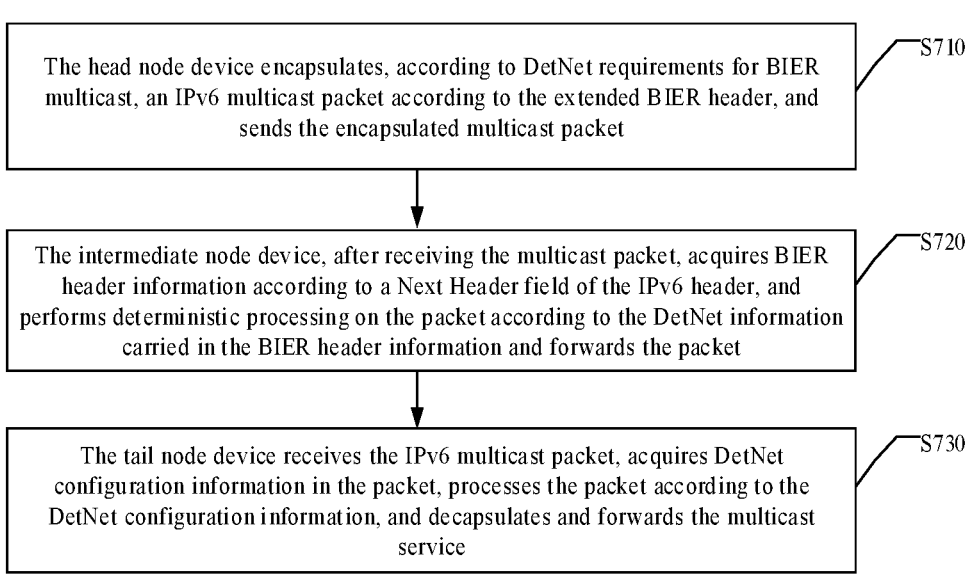
FIG. 13 is a flowchart of a method for implementing BIER DetNet in an IPv6 data plane.
Figure 14:
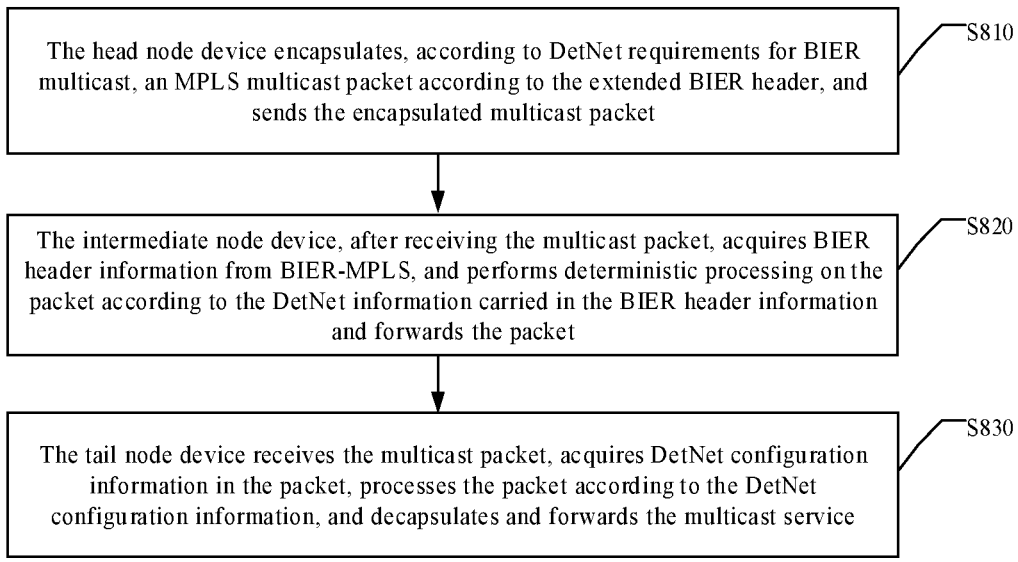
FIG. 14 is a flowchart of a method for implementing BIER DetNet in an MPLS data plane.
Figure 15:
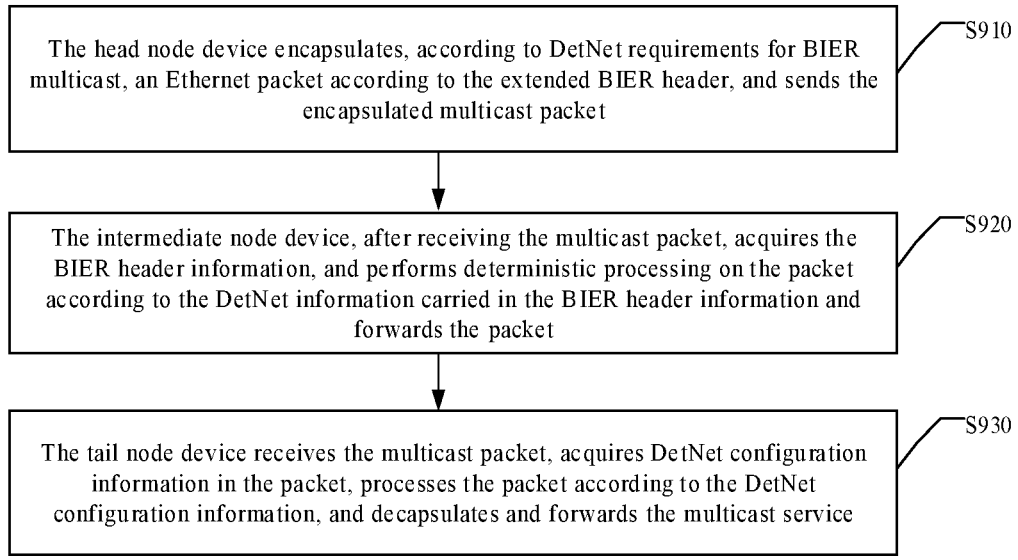
FIG. 15 is a flowchart of a method for implementing BIER DetNet in an Ethernet data plane.

For better understanding of the present disclosure, the following describes, by way of specific embodiments, a method for implementing BIER DetNet under different transport protocols in conjunction with FIGS. 13 to 15. FIG. 13 is a flowchart of a method for implementing BIER DetNet in an IPv6 data plane. As shown in FIG. 13, the method for implementing BIER DetNet in an IPv6 data plane may include the following operations S710 to S730.

In operation S710, the head node device encapsulates, according to DetNet requirements for BIER multicast, an IPv6 multicast packet according to the extended BIER header in the embodiment of the present disclosure, and sends the encapsulated multicast packet.

Specifically, the BIER header may be carried in a Next Header field of the IPv6 packet, where the DetNet Sub-TLV field may be carried in the BIER header, and configured to carry the DetNet information.

The DetNet Sub-TLV field may include a BIER deterministic flow ID field. If packet replication and elimination functions are required, the packet is replicated, and the DetNet Sub-TLV field further carries a sequence number field.

In operation S720, the intermediate node device, after receiving the multicast packet, acquires BIER header information according to a Next Header field of the IPv6 header, and performs deterministic processing on the packet according to the DetNet information carried in the BIER header information and forwards the packet.

Specifically, it is determined whether an extended identification bit D in the BIER header is set to 1. If the extended identification bit D is set to 1, it indicates that the BIER header carries the DetNet Sub-TLV field, then flow identification is performed on the multicast packet, reserved resources are configured according to the deterministic multicast, and the packet is forwarded.

In operation S730, the tail node device receives the IPv6 multicast packet, acquires DetNet configuration information in the packet, processes the packet according to the DetNet configuration information, and decapsulates and forwards the multicast service.

Specifically, the tail node device, after receiving the multicast packet, performs flow identification according to the DetNet configuration information, and determines whether the DetNet field carries a sequence number field. In response to determining that the DetNet field carries a sequence number field, the tail node device acquires a sequence number of the packet, performs replication, elimination or other processing on the DetNet configuration, decapsulates the packet and forwards the multicast service.

For convenience and simplicity of description, detailed description of a known method is omitted here, and the specific packet processing flows at the head node device, the intermediate node device, and the tail node device as described above may refer to the corresponding process in the packet forwarding method embodiment described above, and thus is not repeated here.

FIG. 14 is a flowchart of a method for implementing BIER DetNet in an MPLS data plane. As shown in FIG. 14, the method for implementing BIER DetNet in an MPLS data plane may include the following operations S810 to S830.

In operation S810, the head node device encapsulates, according to DetNet requirements for BIER multicast, an MPLS multicast packet according to the extended BIER header in the embodiment of the present disclosure, and sends the encapsulated multicast packet.

Specifically, data encapsulation may be performed according to RFC8296, and the BIER header may carry a BIER-MPLS label, so as to be compatible with packet format of MPLS data plane.

The DetNet Sub-TLV field is carried in the BIER header, where the DetNet Sub-TLV field may include a BIER deterministic flow ID. Exemplarily, the flow ID may be an MPLS label value, or may be ID information corresponding to the MPLS label value and obtained by mapping the label value, to uniquely identify a BIER deterministic multicast flow.

In the BIER domain, the deterministic processing, including resource reservation or the like, of the BIER flow passing through each node device is identified by configuring the flow ID, and if packet replication and elimination functions are configured, it is required to replicate the packet, and carry the sequence number field into DetNet Sub-TLV.

In operation S820, the intermediate node device, after receiving the multicast packet, acquires BIER header information according to BIER-MPLS, and performs deterministic processing on the packet according to the DetNet information carried in the BIER header information and forwards the packet.

Specifically, it is determined whether an extended identification bit D in the BIER header is set to 1. If the extended identification bit D is set to 1, it indicates that the BIER header carries the DetNet Sub-TLV field, so flow identification is performed on the multicast packet according to the flow ID in the DetNet Sub-TLV field; and reserved resources are configured according to the deterministic multicast, and the packet is forwarded.

In operation S830, the tail node device receives the multicast packet, acquires DetNet configuration information in the packet, processes the packet according to the DetNet configuration information, and decapsulates and forwards the multicast service.

Specifically, the tail node device, after receiving the packet, performs flow identification according to the DetNet configuration information, and determines whether the DetNet field carries a sequence number field. If the DetNet field carries a sequence number field, a sequence number of the packet is acquired, replication, elimination or other processing is performed on the DetNet configuration, and the multicast service is forwarded after the packet is decapsulated.

For convenience and simplicity of description, detailed description of a known method is omitted here, and the specific packet processing flows at the head node device, the intermediate node device, and the tail node device as described above may refer to the corresponding process in the packet forwarding method embodiment described above, and thus is not repeated here.

FIG. 15 is a flowchart of a method for implementing BIER DetNet in an Ethernet data plane. As shown in FIG. 15, the method for implementing BIER DetNet adapted to an Ethernet data plane may include the following operations S910 to S930.

In operation S910, the head node device encapsulates, according to DetNet requirements for BIER multicast, an Ethernet packet according to the extended BIER header in the embodiment of the present disclosure, and sends the encapsulated multicast packet.

Specifically, data encapsulation may be performed according to RFC8296, and the BIER header may carry a BIFT-id to search in a BIER forwarding table.

The DetNet Sub-TLV field is carried in the BIER header, where the DetNet Sub-TLV field may include a BIER deterministic flow ID field to uniquely identify a BIER deterministic multicast flow.

In the BIER domain, the deterministic processing, including resource reservation or the like, of the BIER flow passing through the respective node devices, is identified by configuring the flow ID, and if packet replication and elimination functions are configured, it is required to replicate the packet, and carry the sequence number field of the packet into the DetNet Sub-TLV.

In operation S920, the intermediate node device, after receiving the multicast packet, acquires the BIER header information, and performs deterministic processing on the packet according to the DetNet information carried in the BIER header information and forwards the packet.

Specifically, the BIER information may be searched according to the BIFT-id, and it is determined whether an extended identification bit D in the BIER header is set to 1. If it is determined that the extended identification bit D is set to 1, which indicates that the BIER header carries the DetNet Sub-TLV field, flow identification is performed on the multicast packet according to the flow ID in the DetNet Sub-TLV field, and reserved resources are configured according to the deterministic multicast, and the packet is forwarded.

In operation S930, the tail node device receives the multicast packet, acquires DetNet configuration information in the packet, processes the packet according to the DetNet configuration information, and decapsulates and forwards the multicast service.

Specifically, the tail node device, after receiving the packet, performs flow identification according to the DetNet configuration information, and determines whether the DetNet field carries a sequence number field. If the DetNet field carries a sequence number field, a sequence number of the packet is acquired, replication, elimination or other processing is performed on the DetNet configuration, and the multicast service forwarded after the packet is decapsulated.

For convenience and simplicity of description, detailed description of a known method is omitted here, and the specific packet processing flows at the head node device, the intermediate node device, and the tail node device as described above may refer to the corresponding process in the packet forwarding method embodiment described above, and thus is not repeated here.

As can be seen from the description of the above embodiments, the packet forwarding method in the embodiments of the present disclosure provides a general forwarding method of a BIER-based multicast DetNet, which can extend a BIER header of the multicast packet for multicast packets of different transport protocols, and add related functions of the DetNet technology in the BIER header, so as to provide DetNet through BIER multicast service forwarding, thereby meeting differentiated requirements of 5G services on the network, and implementing reliable transmission services with low time delay and low packet loss rate.

Figure 16:
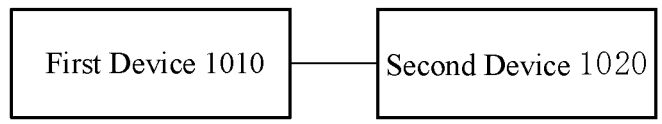
FIG. 16 is a schematic structural diagram of a packet forwarding node apparatus according to an embodiment of the present disclosure.

A packet forwarding node apparatus according to an embodiment of the present disclosure will be described in detail below with reference to the accompanying drawings. FIG. 16 shows a packet forwarding node apparatus according to an embodiment of the present disclosure. As shown in FIG. 16, the packet forwarding node apparatus includes a first device and a second device.

The first device 1010 is configured to carry, according to Deterministic Networking (DetNet) requirements for a multicast packet based on Bit Index Explicit Replication (BIER), corresponding DetNet configuration information in BIER header information of the multicast packet, and send the multicast packet carrying the BIER header information.

The second device 1020 is configured to acquire, from a received multicast packet carrying header information based on Bit Index Explicit Replication (BIER), the DetNet configuration information carried in the BIER header information, and process the packet according to the DetNet configuration information.

In one embodiment, the first device is a head node device of a BIER network, and the second device is an intermediate node device or a tail node device of the BIER network.

In an embodiment, the first device 1010 is further configured to carry an extended identification bit in the BIER header information, where the extended identification bit, when set, is used for indicating that the DetNet configuration information is present in the BIER header information.

In an embodiment, the first device 1010 is further configured to carry a flow ID in the DetNet configuration information, where one BIER multicast flow can be uniquely identified through the flow ID.

In an embodiment, the flow ID is ID information defined corresponding to a packet type, the packet type including: an IPv6 packet, a multiprotocol label switching protocol (MPLS) packet, or an Ethernet packet.

In an embodiment, in a case where the BIER-based multicast packet is an MPLS packet, the flow ID is an MPLS label or a mapping value of the MPLS label; and in a case where the BIER-based multicast packet is an IPv6 packet or an Ethernet packet, the flow ID is a unique flow ID assigned to the BIER multicast flow.

In an embodiment, in a case where the DetNet requirements include packet replication and elimination, before sending the multicast packet carrying the BIER header information, the first device 1010 is further configured to replicate the multicast packet carrying the BIER header information, and carry a packet sequence number in the DetNet configuration information.

In an embodiment, the first device 1010 is further configured to carry a sequence number identification bit in the DetNet configuration information, where the sequence number identification bit, when set, is used for indicating that the packet sequence number is present in the DetNet configuration information.

In an embodiment, in a case where the BIER-based multicast packet is an IPv6 packet, the BIER header information is carried in a Next Header field of the IPv6 packet; in a case where the BIER-based multicast packet is an MPLS packet, the BIER header information carries an MPLS label; and in a case where the BIER-based multicast packet is an Ethernet packet, the BIER header information carries a BIFT ID.

In an embodiment, the second device 1020 is further configured to: read, before acquiring the DetNet configuration information carried in the , an extended identification bit carried in the BIER header information, and determine whether the extended identification bit is set; determine, if the extended identification bit is set, that the received multicast packet carries the DetNet configuration information.

In an embodiment, the second device 1020 is an intermediate node device, and the intermediate node device is further configured to: forward, in a case where the extended identification bit is not set, the received multicast packet based on BIER.

In an embodiment, when configured to process the packet according to the DetNet configuration information, the second device 1020 is specifically configured to: identify, according to a flow ID carried in the DetNet configuration information, a multicast flow from the received multicast packet carrying the BIER header information, and configure reserved resources for the identified multicast flow.

In an embodiment, when configured to process the packet according to the DetNet configuration information, the second device 1020is specifically configured to: acquire a packet sequence number carried in the DetNet configuration information, and replicate and eliminate the received multicast packet based on the sequence number.

In an embodiment, the DetNet configuration information further carries a sequence number identification bit, and the second device 2020 is further configured to: determine, before acquiring the packet sequence number carried in the DetNet configuration information, whether the sequence number identification bit is set; and determine, if the sequence number identification bit is set, that the packet sequence number is present in the DetNet configuration information.

In an embodiment, the second device 1020 is an intermediate node device, and the intermediate node device is further configured to: forward, after processing the packet according to the DetNet configuration information, the processed multicast packet based on BIER.

In an embodiment, the second device 1020 is a tail node device, and the tail node device is further configured to: acquire and forward, after processing the packet according to the DetNet configuration information, a multicast service carried in the processed multicast packet.

According to the packet forwarding node apparatus in the embodiment of the present disclosure, the first device encapsulates, according to DetNet requirements for BIER multicast, a multicast packet according to the extended BIER header in the embodiment of the present disclosure, and after receiving the packet, the second device processes the packet according to the DetNet configuration information, thereby providing deterministic delay and reliable services for BIER-based multicast and DetNet for BIER multicast, and meeting the requirements of less time delay and low packet loss rate in a 5G network.

Figure 17:
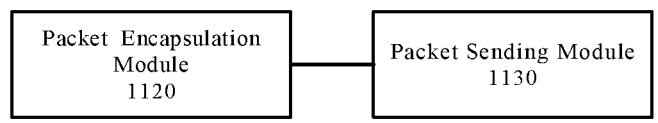
FIG. 17 is a schematic structural diagram of a first device according to an embodiment of the present disclosure.

FIG. 17 is a schematic structural diagram of a first device according to an embodiment of the present disclosure. As shown in FIG. 17, the first device 1100 includes a packet encapsulation module 1120 and packet sending module 1130.

The packet encapsulation module 1120 is configured to carry, according to Deterministic Networking (DetNet) requirements for a multicast packet based on Bit Index Explicit Replication (BIER), corresponding DetNet configuration information in BIER header information of the multicast packet. The packet sending module 1130 is configured to send the multicast packet carrying the BIER header information.

In an embodiment, the first device is further specifically configured to: carry, before sending the multicast packet carrying the BIER header information, an extended identification bit in the BIER header information, where the extended identification bit, when set, is used for indicating that the DetNet configuration information is present in the BIER header information.

In an embodiment, the first device is further specifically configured to: carry, before sending the multicast packet carrying the BIER header information, a flow ID in the DetNet configuration information, where one BIER multicast flow is uniquely identified through the flow ID.

Specifically, the flow ID is ID information defined corresponding to a packet type, the packet type including: an IPv6 packet, a multiprotocol label switching protocol (MPLS) packet, or an Ethernet packet.

As an example, in a case where the BIER-based multicast packet is an MPLS packet, the flow ID is an MPLS label or a mapping value of the MPLS label; and in a case where the BIER-based multicast packet is an IPv6 packet or an Ethernet packet, the flow ID is a unique flow ID assigned to the BIER multicast flow.

In an embodiment, in a case where the DetNet requirements include packet replication and elimination, the first device may further include: a sequence number carrying module configured to replicate the multicast packet carrying the BIER header information, and carry a packet sequence number in the DetNet configuration information.

In an embodiment, the first device may specifically further include a sequence number identification bit carrying module. The sequence number identification bit carrying module is configured to carry a sequence number identification bit in the DetNet configuration information, where the sequence number identification bit, when set, is used for indicating that the packet sequence number is present in the DetNet configuration information.

According to the embodiment of the present disclosure, the first device, such as a head node device, encapsulates, according to DetNet requirements for BIER multicast, the packet according to the extended BIER header in the embodiment of the present disclosure, and carries the DetNet configuration information in the BIER header by carrying the DetNet Sub-TLV field in the identification BIER header, thereby providing DetNet through BIER multicast service forwarding.

Figure 18:
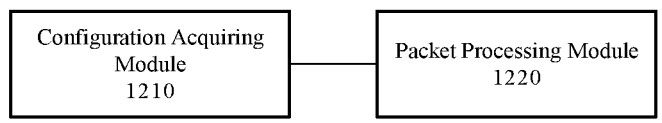
FIG. 18 is a schematic structural diagram of a second device according to an embodiment of the present disclosure.

FIG. 18 is a schematic structural diagram of a second device according to an embodiment of the present disclosure. As shown in FIG. 18, the second device includes a configuration acquiring module 1210 and a packet processing module 1220.

The configuration acquiring module 1210 is configured to acquire, from the received multicast packet carrying the BIER header information, Deterministic Networking (DetNet) configuration information carried in the BIER header information. The packet processing module 1220 is configured to process the packet according to the DetNet configuration information.

In an embodiment, an extended identification bit is set in the BIER header information of the multicast packet, and the second device may further include: an extended ID determining module configured to read, before acquiring the DetNet configuration information carried in the multicast packet, an extended identification bit carried in the BIER header information, and determine whether the extended identification bit is set; and an information determining module configured to determine, in a case where the extended identification bit is set, that the received multicast packet carries the DetNet configuration information.

In an embodiment, the second device is an intermediate node device, which may further include: a packet forwarding module configured to forward, in a case where the extended identification bit is not set, the received multicast packet based on BIER.

In an embodiment, the packet processing module 1220 may specifically include: a resource reservation unit configured to identify, according to a flow ID carried in the DetNet configuration information, a multicast flow from the received multicast packet carrying the BIER header information, and configure reserved resources for the identified multicast flow.

In an embodiment, the packet processing module 1220 may specifically include: a replication and elimination unit configured to acquire a packet sequence number carried in the DetNet configuration information, and replicate and eliminate the received multicast packet based on the packet sequence number.

In an embodiment, a sequence number identification bit is carried in the DetNet configuration information, and the second device may further include: a sequence number identification determining module configured to determine, before acquiring the packet sequence number carried in the DetNet configuration information, whether the sequence number identification bit is set, and determine, in a case where the sequence number identification bit is set, that the packet sequence number is present in the DetNet configuration information.

In an embodiment, the second device is an intermediate node device, and the packet forwarding module of the intermediate node device is further configured to: forward the multicast packet based on BIER, the multicast packet having been processed according to the DetNet configuration information.

In an embodiment, the second device is a tail node device, and the tail node device may further include: a service forwarding module configured to acquire and forward a multicast service carried in the processed multicast packet.

According to the second device in the embodiment of the disclosure, in a case where the second device is an intermediate node device, after receiving the BIER-based multicast packet, the second device may process and forward the packet according to the DetNet configuration information carried in the BIER header information, thereby the provision of DetNet for the multicast packet is realized. In a case where the second device is a tail node device, after receiving the BIER-based multicast packet, the second device may perform flow identification on the BIER multicast flow, perform replication, elimination, or other processing on the DetNet configuration, and forward the multicast service after decapsulating the packet, thereby implementing the DetNet function in the BIER multicast technology.

As can be seen from the description of the above embodiments, according to the packet forwarding node apparatus in the embodiment of the present disclosure, in order to meet the requirements of deterministic services and the like, the head node device may, according to the DetNet requirements, carry DetNet information corresponding to the DetNet requirements carried in the BIER multicast packet through the extended BIER header information; the intermediate node device, after receiving the deterministic multicast flow, performs flow identification on the packet, so that reserved resources are configured according to the deterministic multicast, and the packet is forwarded; and the tail node device, after receiving the deterministic multicast flow, acquires the extended DetNet configuration information therein, processes the packet according to said DetNet configuration, and forwards the multicast service after decapsulating the packet, so as to implement the DetNet function through forwarding of the BIER multicast service, thereby providing deterministic delay and reliable services for multicast, and meeting the requirements of less time delay and low packet loss rate in a 5G network.

It should be noted that the present disclosure is not limited to the particular configurations and processes described in the above embodiments and illustrated in the drawings. For convenience and simplicity of description, detailed description of a known method is omitted here, and for the specific working processes of the system, the module and the unit described above, reference may be made to corresponding processes in the foregoing method embodiments, which are not repeated here.

Figure 19:
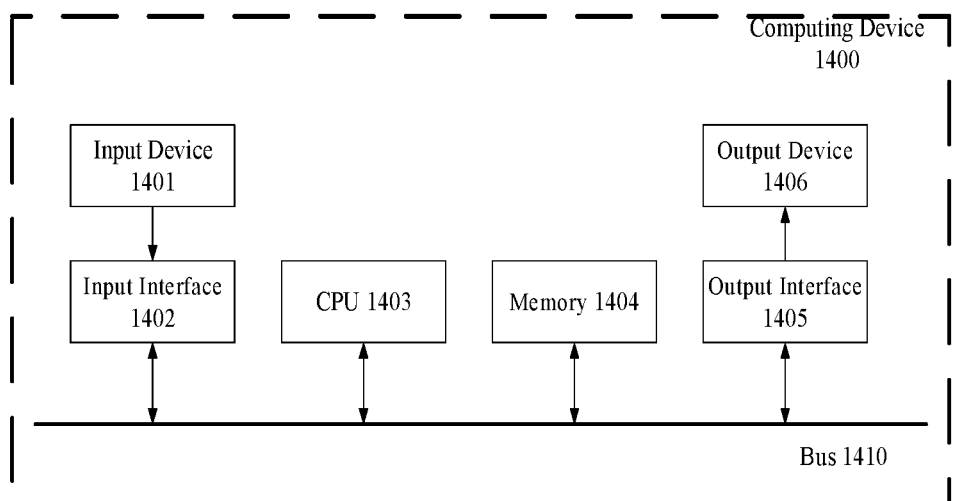
FIG. 19 is a block diagram of an exemplary hardware architecture of a computing device capable of implementing the packet forwarding method and apparatus according to embodiments of the present disclosure.

FIG. 19 is a block diagram of an exemplary hardware architecture of a computing device capable of implementing the packet forwarding method and apparatus according to embodiments of the present disclosure.

As shown in FIG. 19, a computing device 1400 includes an input device 1401, an input interface 1402, a central processing unit 1403, a memory 1404, an output interface 1405, and an output device 1406. The input interface 1402, the central processing unit 1403, the memory 1404, and the output interface 1405 are interconnected via a bus 1410, and the input device 1401 and the output device 1406 are connected to the bus 1410 via the input interface 1402 and the output interface 1405, respectively, and in turn connected to other components of the computing device 1400.

Specifically, the input device 1401 receives input information from the outside, and transmits the input information to the central processing unit 1403 via the input interface 1402. The central processing unit 1403 processes input information based on computer-executable instructions stored in the memory 1404 to generate output information, stores the output information temporarily or permanently in the memory 1404, and then transmits the output information to the output device 1406 via the output interface 1405. The output device 1406 outputs the output information to the outside of the computing device 1400 for use by a user.

In an embodiment, the computing device 1400 shown in FIG. 19 may be implemented as a packet forwarding system, which may include: a memory configured to store a program; and a processor configured to execute the program stored in the memory to perform the packet forwarding method described in the above embodiments and applied to any of the described embodiments of the present disclosure.

According to the embodiments of the present disclosure, the processes described above in conjunction with the flowcharts may be implemented as computer software program. For example, an embodiment of the present disclosure includes a computer program product including a computer program tangibly embodied in a machine-readable medium, where the computer program contains program codes to execute the methods shown in the flowcharts. In such embodiments, the computer program may be downloaded and installed from a network, and/or installed from a removable storage medium.

Those of ordinary skill in the art will appreciate that all or some operations of the above described method, functional modules/units in the system and apparatus may be implemented as software, firmware, hardware, and suitable combinations thereof. In a hardware implementation, the division between the functional modules/units mentioned in the above description does not necessarily correspond to the division of physical components; for example, one physical component may have multiple functions, or one function or operation may be performed cooperatively by several physical components. Some or all physical components may be implemented as software executed by a processor, such as a CPU, a digital signal processor or microprocessor, or implemented as hardware, or implemented as an integrated circuit, such as an application specific integrated circuit. Such software may be distributed on a computer-readable medium which may include a computer storage medium (or non-transitory medium) and communication medium (or transitory medium). As is well known to those of ordinary skill in the art, the term computer storage medium includes volatile and nonvolatile, removable and non-removable medium implemented in any method or technology for storing information, such as computer-readable instructions, data structures, program modules or other data. A computer storage medium includes, but is not limited to, RAM, ROM, EEPROM, flash memory or other memory technology, CD-ROM, digital versatile disc (DVD) or other optical disc storage, magnetic cartridge, magnetic tape, magnetic disk storage or other magnetic storage devices, or may be any other medium used for storing the desired information and accessible by a computer. Moreover, it is well known to those ordinary skilled in the art that a communication medium typically includes a computer-readable instruction, a data structure, a program module, or other data in a modulated data signal, such as a carrier wave or other transport mechanism, and may include any information delivery medium.

It will be appreciated that the above implementations are merely exemplary implementations for the purpose of illustrating the principle of the present disclosure, and the present disclosure is not limited thereto. It will be apparent to one of ordinary skill in the art that various modifications and variations may be made without departing from the spirit or essence of the present disclosure. Such modifications and variations should also be considered as falling into the protection scope of the present disclosure.

What is claimed is:

1. A packet forwarding method applied to a first device, the method comprising:
   carrying, according to Deterministic Networking (DetNet) requirements for a multicast packet based on Bit Index Explicit Replication (BIER), corresponding DetNet configuration information in BIER header information of the multicast packet; and
   sending the multicast packet carrying the BIER header information,
   wherein before sending the multicast packet carrying the BIER header information, the method further comprises:
     carrying in the DetNet configuration information, a flow ID through which one BIER multicast flow is capable of being uniquely identified, the flow ID is ID information defined corresponding to a packet type, the packet type comprising an IPv6 packet, a multiprotocol label switching protocol (MPLS) packet, or an Ethernet packet,
   and wherein:
     in a case where the BIER-based multicast packet is an MPLS packet, the flow ID is an MPLS label or a mapping value of the MPLS label; and
     in a case where the BIER-based multicast packet is an IPv6 packet or an Ethernet packet, the flow ID is a unique flow ID assigned to the BIER multicast flow.

2. The method according to claim 1, wherein before sending the multicast packet carrying the BIER header information, the method further comprises:
carrying an extended identification bit in the BIER header information, wherein the extended identification bit, when set, is used for indicating that the DetNet configuration information is present in the BIER header information.

3. The method according to claim 1, wherein in a case where the DetNet requirements comprise packet replication and elimination, before sending the multicast packet carrying the BIER header information, the method further comprises:
replicating the multicast packet carrying the BIER header information, and carrying a packet sequence number in the DetNet configuration information.

4. The method according to claim 3, wherein the method further comprises:
carrying a sequence number identification bit in the DetNet configuration information, wherein the sequence number identification bit, when set, is used for indicating that the packet sequence number is present in the DetNet configuration information.

5. A packet forwarding method applied to a second device, the method comprising:
acquiring, from a received multicast packet carrying header information based on Bit Index Explicit Replication (BIER), Deterministic Networking (DetNet) configuration information carried in the BIER header information, wherein the DetNet configuration information carries a flow ID through which one BIER multicast flow is capable of being uniquely identified, the flow ID is ID information defined corresponding to a packet type, the packet type comprising an IPv6 packet, a multiprotocol label switching protocol (MPLS) packet, or an Ethernet packet,
and wherein in a case where the BIER-based multicast packet is an MPLS packet, the flow ID is an MPLS label or a mapping value of the MPLS label; and
in a case where the BIER-based multicast packet is an IPv6 packet or an Ethernet packet, the flow ID is a unique flow ID assigned to the BIER multicast flow; and
processing the packet according to the DetNet configuration information.

6. The method according to claim 5, wherein before acquiring the DetNet configuration information, the method further comprises:
reading an extended identification bit carried in the BIER header information, and determining whether the extended identification bit is set; and
determining, in response to determining that the extended identification bit is set, that the received multicast packet carries the DetNet configuration information.

7. The method according to claim 6, wherein the second device is an intermediate node device, and the method further comprises:
forwarding, if the extended identification bit is not set, the received multicast packet by the intermediate node device based on BIER.

8. The method according to claim 5, wherein the processing the packet according to the DetNet configuration information comprises:
identifying, according to the flow ID carried in the DetNet configuration information, a multicast flow from the received multicast packet carrying the BIER header information, and configuring reserved resources for the identified multicast flow.

9. The method according to claim 5, wherein the processing the packet according to the DetNet configuration information comprises:
acquiring a packet sequence number carried in the DetNet configuration information, and implement replication and elimination on the received multicast packet based on the packet sequence number.

10. The method according to claim 9, wherein the DetNet configuration information further carries a sequence number identification bit, and before acquiring the packet sequence number carried in the DetNet configuration information, the method further comprises:
determining whether the sequence number identification bit is set; and
determining, in response to determining that the sequence number identification bit is set, that the packet sequence number is present in the DetNet configuration information.

11. The method according to claim 5, wherein the second device is an intermediate node device, and after processing the packet according to the DetNet configuration information, the method further comprises:
forwarding, by the intermediate node device and based on BIER, the multicast packet processed according to the DetNet configuration information.

12. The method according to claim 5, wherein the second device is a tail node device, and after processing the packet according to the DetNet configuration information, the method further comprises:
acquiring and forwarding, by the tail node device, a multicast service carried in the processed multicast packet.

13. A packet forwarding node apparatus, comprising:
a first device configured to carry, according to Deterministic Networking (DetNet) requirements for a multicast packet based on Bit Index Explicit Replication (BIER), corresponding DetNet configuration information in BIER header information of the multicast packet, and send the multicast packet carrying the BIER header information; and
a second device configured to acquire, from the received multicast packet carrying the BIER header information, the DetNet configuration information, and process the packet according to the DetNet configuration information; wherein before sending the multicast packet carrying the BIER header information, the DetNet configuration information carries a flow ID through which one BIER multicast flow is capable of being uniquely identified, the flow ID is ID information defined corresponding to a packet type, the packet type comprising an IPv6 packet, a multiprotocol label switching protocol (MPLS) packet, or an Ethernet packet,
and wherein:
in a case where the BIER-based multicast packet is an MPLS packet, the flow ID is an MPLS label or a mapping value of the MPLS label; and
in a case where the BIER-based multicast packet is an IPv6 packet or an Ethernet packet, the flow ID is a unique flow ID assigned to the BIER multicast flow.

14. A first device, comprising a non-transitory computer-readable storage and a processor; wherein the non-transitory computer-readable storage is configured to store executable program codes; and the processor is configured to read the executable program codes stored in the non-transitory computer-readable storage to perform the packet forwarding method of claim 1.

15. A second device, comprising a non-transitory computer- readable storage and a processor; wherein the non-transitory computer-readable storage is configured to store executable program codes; and the processor is configured to read the executable program codes stored in the non-transitory computer-readable storage to perform the packet forwarding method of claim 5.

16. A non-transitory computer-readable storage medium storing instructions, which, when executed on a processor, cause the processor to perform the packet forwarding method of claim 1.

17. A non-transitory computer-readable storage medium storing instructions, which, when executed on a processor, cause the processor to perform the packet forwarding method of claim 5.

* * * * *